United States Patent
Pal

(10) Patent No.: US 7,637,462 B2
(45) Date of Patent: Dec. 29, 2009

(54) SURFACE FLOW DIVERTING AND STATIC CHARGING DUCTED PORES ON WING OR BLADE TIP TO REDUCE WAKE AND BVI NOISE

(76) Inventor: Anadish Kumar Pal, 194 Vaishali, Pitampura, Delhi, Delhi (IN) 110088

( * ) Notice: Subject to any disclaimer, the term of this patent is extended or adjusted under 35 U.S.C. 154(b) by 581 days.

(21) Appl. No.: 11/509,780

(22) Filed: Aug. 25, 2006

(65) Prior Publication Data

US 2007/0252047 A1 Nov. 1, 2007

(51) Int. Cl.
*B64C 23/06* (2006.01)
*B64C 21/04* (2006.01)

(52) U.S. Cl. .................. 244/199.2; 244/207; 244/208; 244/209; 416/90 R; 415/914

(58) Field of Classification Search ............. 244/205, 244/210, 207–209, 199.1, 199.2, 199.3, 199.4, 244/198, 204, 204.1, 200, 200.1, 201, 203, 244/1 A, 1 N; 416/90 R, 90 A, 91, 92, 231 R; 415/119, 914
See application file for complete search history.

(56) References Cited

U.S. PATENT DOCUMENTS 3,936,013 A * 2/1976 Yuan ..................... 244/199.3
3,974,986 A * 8/1976 Johnstone ................ 244/199.3
5,167,387 A * 12/1992 Hartwich .................... 244/200
5,326,224 A * 7/1994 Lee et al. ................... 416/97 R
6,948,906 B2 * 9/2005 Leishman et al. ........... 415/119
2004/0197194 A1* 10/2004 Leishman et al. ........... 416/232
2006/0062671 A1* 3/2006 Lee et al. ...................... 416/92

* cited by examiner

*Primary Examiner*—Michael R Mansen
*Assistant Examiner*—Joshua J Michener

(57) ABSTRACT

Air pressure distribution for airfoil lower and upper surfaces is utilized to divert airflow using ducts formed in space-curve shapes placed inside the airfoil volume, through span-wise located inlets from high pressure areas on the airfoil lower surface near the leading edge and through chord-wise spaced inlets on the side face of the airfoil wing tip correspondingly to the side face of the airfoil wing tip through chord-wise spaced outlets on the side face of the airfoil wing tip and to span-wise located outlets to the low pressure areas on the airfoil upper surface. Triboelectric materials on the wing surfaces are employed to static charge the air in drag. Inside the ducts, the employment of either triboelectric linings and materials, or HV-supplied electrodes, or both, help to static charge the diverted air flow to and from the airfoil wing tip side face to diffuse wing tip vortex core early.

12 Claims, 2 Drawing Sheets

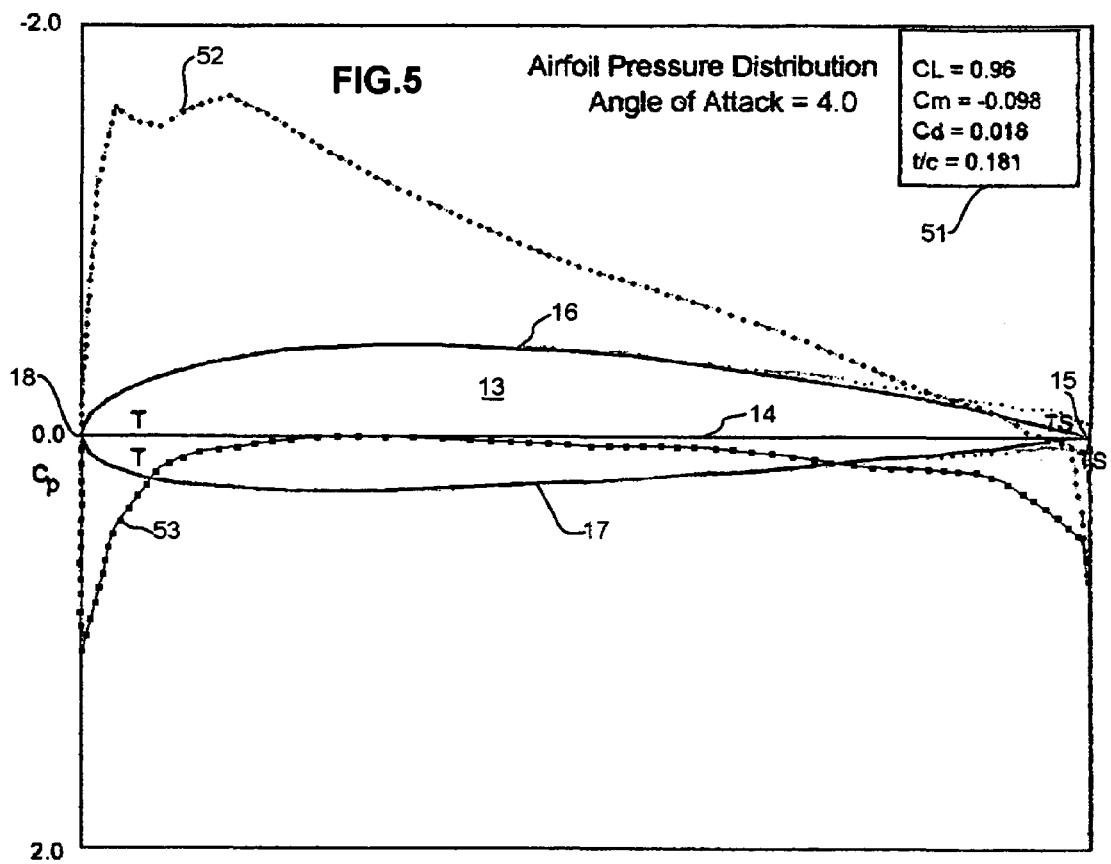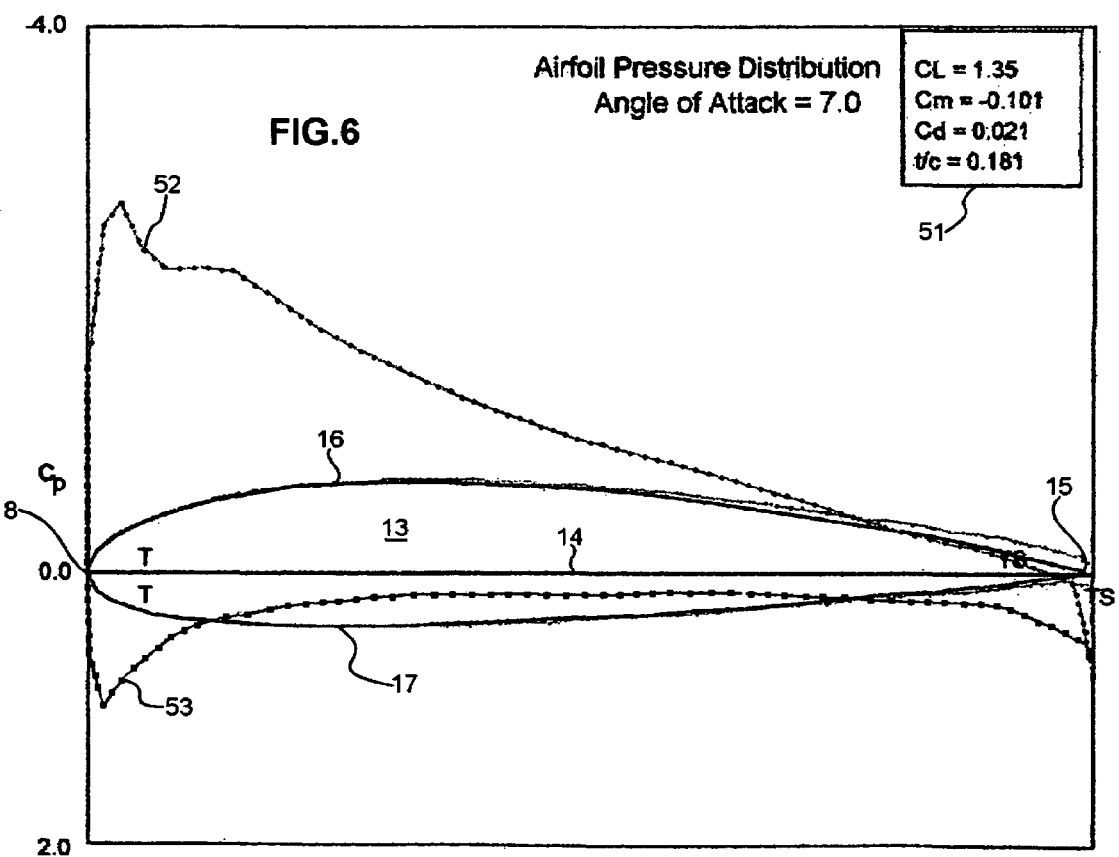

SURFACE FLOW DIVERTING AND STATIC CHARGING DUCTED PORES ON WING OR BLADE TIP TO REDUCE WAKE AND BVI NOISE

CROSS-REFERENCE TO RELATED APPLICATIONS

Foreign application priority claimed from Indian Patent Application No. 1091/DEL/2006 of Apr. 28, 2006, entitled, 'Surface flow diverting and static charging ducted pores on wing or blade tip to reduce wake and BVI noise.'

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to reduction of aircraft wing wake and rotorcraft blade-vortex-interference.

In a rotorcraft airfoil, the concept of leading edge incident flow diversion to wing tip was proposed by Dancila in 2002. U.S. Pat. No. 6,948,906 (Leishman, et al) discloses a scheme of having at least one inlet located above the leading edge of a rotorcraft airfoil blade, where the leading edge incident air flow entering an arc-shaped tube through the inlet located above the leading edge and comes out as a jet from an outlet located at the blade tip side face. The air from the jet mixes with the blade vortex inner core and reduces blade vortex by as much as 60% in comparison to an unslotted baseline blade tip.

U.S. Pat. No. 6,948,906 does not disclose the implications of variations in locating the inlet either on the chord plane or between the chord plane and the upper surface of the rotorcraft airfoil blade. The study which led to the present invention suggests that in the conditions disclosed in U.S. Pat. No. 6,948,906, the inlet, instead of capturing the airfoil incident flow, functions as an outlet which vents the high-pressure rollup air at the tip side face to the low-pressure areas above the airfoil leading edge. The present state of technology does not offer a simple method to produce counter-rotating vortices without changing the airfoil outer shape or without the addition of wing-tip turbines. There is a great need to reduce blade and wing tip vortices without adding more form drag and mass to the blade or wing tip and without compromising strength.

BRIEF SUMMARY OF THE INVENTION

A brief review of prior art presented hereinabove, brings out the need for devices and methods which can offer improved solutions to the above-discussed problems. Air pressure distribution for airfoil lower and upper surfaces is utilized to divert air flow using ducts placed in the shape of space curves inside the volume formed by the airfoil, through span-wise located inlets from high pressure areas on the airfoil lower surface near the leading edge and through chord-wise spaced inlets on the side face of the airfoil wing tip correspondingly to the side face of the airfoil wing tip through chord-wise spaced outlets on the side face of the airfoil wing tip and to span-wise located outlets to the low pressure areas on the airfoil upper surface. The chord-wise spaced inlets and outlets to the ducts are flush with the outer side of the side face of the airfoil wing tip and the outer side of the side face of the wing tip is a normal plane to the ducts placed in the shape of space curves inside the volume formed by the airfoil.

Selective use of triboelectric materials and/or coatings inside the ducts and on the wing surfaces is done to static charge the air rubbing against fast moving ducts and wing surfaces. The constant presence of suspended particles in air, impart a static charge on it, when they rub against appropriate triboelectric materials; consequently, triboelectric materials also get static charge. A static-charged triboelectric surface or lining on the wing first attracts air and as soon as the air receives the charge, it is repulsed. This charging process is employed to momentarily decelerate air near the wing tip to delay vortex rollup and to static charge. Inside the fast moving ducts, the employment of either triboelectric linings and materials, or HV electrodes or both, helps in static charging of the diverted air flow to and from the airfoil wing tip side face, which helps to early diffuse wing tip vortex core by possibly promoting interlayer movement of air molecules due to static charge potential differences.

Various versions of the present invention offer approaches to the problems present in prior art in following manners:

In one embodiment of the present invention, air pressure distribution for airfoil lower surface is utilized to divert air flow using ducts, through span-wise located inlets from high pressure areas on the airfoil lower surface near the leading edge to the side face of the airfoil wing tip.

In the second embodiment of the present invention, low air pressure distribution for airfoil upper surface is utilized through chord-wise spaced inlets on the side face of the airfoil wing tip to divert air through ducts to span-wise located outlets to the low pressure areas on the airfoil upper surface.

In the third form of the present invention, air flow is diverted using ducts, through span-wise located inlets from high pressure areas on the airfoil lower surface near the leading edge and through chord-wise spaced inlets on the side face of the airfoil wing tip correspondingly to the side face of the airfoil wing tip and to span-wise located outlets to the low pressure areas on the airfoil upper surface.

In the fourth form of the present invention, air pressure distribution for airfoil lower surface is utilized to divert air flow using dielectric ducts lined with triboelectric material and/or with high-voltage-supplied electrodes, through span-wise located inlets from high pressure areas on the airfoil lower surface near the leading edge to the side face of the airfoil wing tip.

In the fifth form of the present invention, low air pressure distribution for airfoil upper surface is utilized through chord-wise spaced inlets on the side face of the airfoil wing tip to divert air through dielectric ducts lined with triboelectric material and/or with high-voltage-supplied electrodes to span-wise located outlets to the low pressure areas on the airfoil upper surface.

In the sixth form of the present invention, air flow is diverted using dielectric ducts lined with triboelectric materials and/or with high-voltage-supplied electrodes, through span-wise located inlets from high pressure areas on the airfoil lower surface near the leading edge and through chord-wise spaced inlets on the side face of the airfoil wing tip correspondingly to the side face of the airfoil wing tip and to span-wise located outlets to the low pressure areas on the airfoil upper surface.

In the seventh form of the present invention, air pressure distribution for airfoil lower surface is utilized to divert air flow using dielectric ducts lined with triboelectric material and/or with high-voltage-supplied electrodes, through spanwise located inlets from high pressure areas on the airfoil lower surface near the leading edge to the side face of the airfoil wing tip which is made of a dielectric with triboelectric properties.

In the eighth form of the present invention, low air pressure distribution for airfoil upper surface is utilized through chordwise spaced inlets on the side face of the airfoil wing tip, made of a dielectric with triboelectric properties, to divert air through dielectric ducts lined with triboelectric material and/or with high-voltage-supplied electrodes to span-wise located outlets to the low pressure areas on the airfoil upper surface.

In the ninth form of the present invention, air flow is diverted using dielectric ducts lined with triboelectric materials and/or with high-voltage-supplied electrodes, through span-wise located inlets from high pressure areas on the airfoil lower surface near the leading edge and through chordwise spaced inlets on the side face of the airfoil wing tip which is made of a dielectric with triboelectric properties, correspondingly to the side face of the airfoil wing tip and to span-wise located outlets to the low pressure areas on the airfoil upper surface.

To further the understanding of various versions of the present invention, the following drawings depict some of the functional and constructional details of the present invention, which also help in the understanding of the detailed description of the preferred embodiments.

BRIEF DESCRIPTION OF THE SEVERAL VIEWS OF THE DRAWINGS

Accompanying drawings on 2 sheets are 6 in number. All the drawings uniformly depict airfoil section NACA 2415.

FIG. 5 shows pressure distribution for NACA 2415 airfoil at a 4° angle of attack, generated with the use of software provided by Aircraft Aerodynamics and Design Group, a research lab in Stanford University, Department of Aeronautics and Astronautics through their experimental in-house server.

FIG. 6 shows pressure distribution for NACA 2415 airfoil at a 7° angle of attack, generated with the use of software provided by Aircraft Aerodynamics and Design Group, a research lab in Stanford University, Department of Aeronautics and Astronautics through their experimental in-house server.

DETAILED DESCRIPTION OF THE INVENTION

Figure 1:
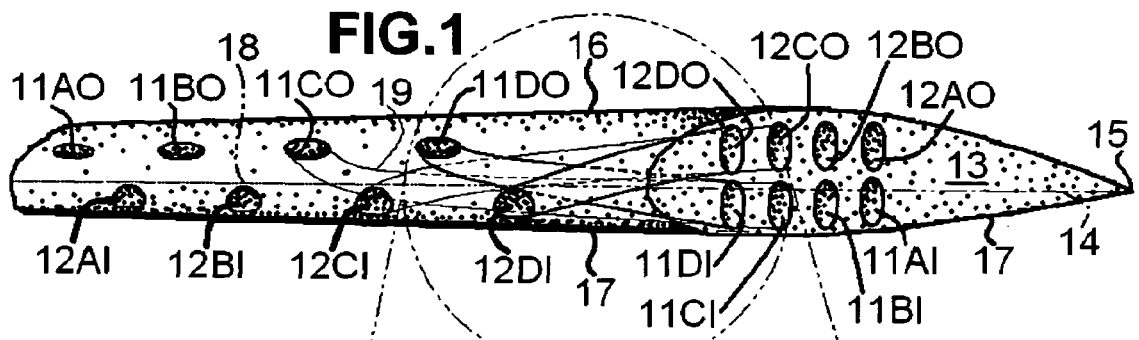
FIG. 1 is schematic tip-end partial see-through side perspective view of the airfoil wing with a flat wing tip with two rows of chord-wise pores.
Figure 2:
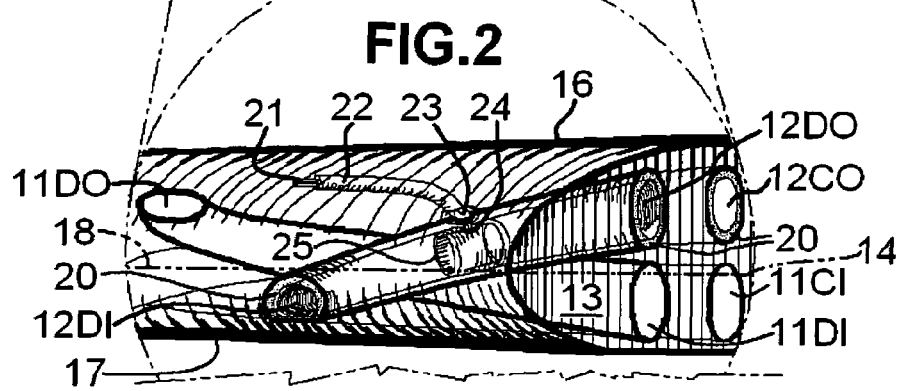
FIG. 2 is an enlarged tip-end see-through side perspective view of a section from FIG. 1 of the airfoil wing with a flat wing tip with two rows of chord-wise pores. In this view, the high-voltage and triboelectric elements in the ducted pores clearly stand out.
Figure 3:
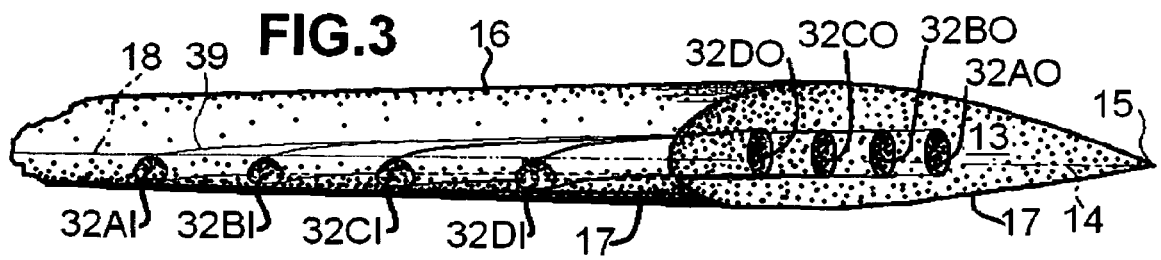
FIG. 3 is schematic tip-end partial see-through side perspective view of the airfoil wing with a flat wing tip having a single row of chord-wise air outlet pores.
Figure 4:
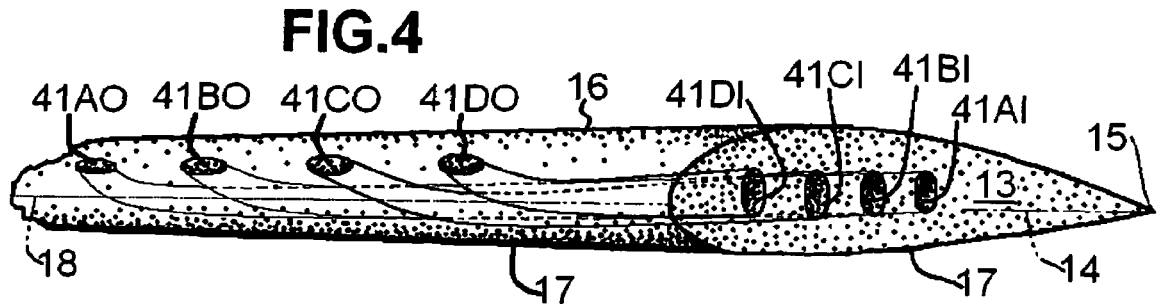
FIG. 4 is schematic tip-end partial see-through side perspective view of the airfoil wing with a flat wing tip with a single row of chord-wise air inlet pores.

The airfoil wing tip ends shown in FIG. 1, FIG. 3 and FIG. 4 could belong to an aircraft or rotorcraft. The wing tip end in FIG. 1 has airfoil section NACA 2415 with upper surface 16, lower surface 17, leading edge 18, chord line 14, trailing edge 15 and wing tip side face 13. FIG. 2 also shows the above-recited elements save trailing edge 15. Wing tip side face 13 acts as a span-wise closing, if the airfoil described above is considered to have an inside volume formed by the enclosure of upper surface 16, lower surface 17 and wing tip side face 13. In FIG. 1, 11AI, 11BI, 11CI and 11DI are wing tip side face inlets to ducted pores (one shown as ducted pore 19 in FIG. 1) which correspondingly lead air adjacent to wing tip side face 13 to upper surface outlets 11AO, 11BO. 11CO and 11DO on upper surface 16 (FIG. 1). Similarly, Lower surface inlets 12AI, 12BI, 12CI and 12DI on lower surface 17 (FIG. 1) are airfoil lower surface inlets to ducted pores (similar to ducted pore 19 in FIG. 1) which correspondingly lead airfoil lower surface air near leading edge 18 to wing tip side face outlets 12AO, 12BO, 12CO and 12DO at wing tip side face 13. As the airfoil wing tip end moves along with the wing through the air, a counter-rotating vortex is set up inside the core of the main wing tip vortex. It was, however, not possible to discriminate with naked eyes the individual vortices possibly being generated by each pair of pores on wing tip side face 13. The counter-rotating vortex was followed to a length nearly as long as c (chord) and it was noticed to be radially moving slightly outwards rather than inwards like the usual wing tip vortex.

Ducted pores (similar to ducted pore 19 in FIG. 1) in FIG. 2 are shown in detail in FIG. 2. Dielectric ducted pore lining 20 is shown at lower surface inlet 12DI, wing tip side face outlets 12DO and 12CO. Dielectric ducted pore lining 20 can also have added positive or negative triboelectric properties to impart a static electric charge on the air coming in contact with dielectric ducted pore lining 20 to encourage inter-layer mixing in the blade vortex or aircraft wing tip wake. Additionally, HV electrode 25 (FIG. 2) is coaxially placed inside dielectric ducted pore lining 20 which may or may not have triboelectric properties. HV electrode 25 is welded at HV joint 24 (FIG. 2) to HV cable 21; HV cable sheath 22 has to be sealed with HV sealant 23 (all in FIG. 2) to prevent electrical leakage from the HV cable entry point into dielectric ducted pore lining 20. The application of a positive high voltage of approximately 2 kV to HV electrode 25 through HV cable 21 (the aluminum body of the wing was at 0 V) was found sufficient to produce reduction in BVI noise and wing tip vortex by nearly 20%. It was also noticed that the quality of BVI noise changed and the share of high-frequency components increased. The positive high voltage to HV electrode 25 can be adjusted or constantly modulated between 0.5 to 18 kV, in order to impart a static electric charge on the air coming in contact with HV electrode 25. Flight operating conditions determine the optimum level of positive high voltage to HV electrode 25; higher voltages mean greater BVI-noise suppression at the cost of greater chances of accidental arcing. In dry air conditions, higher voltage levels are safe with a current limit applied to the high-voltage generator output applying the positive high voltage to HV electrode 25 through HV cable 21. Instead of a dc high voltage, an ac high voltage can also be applied to HV electrode 25 through HV cable 21. The frequency of the ac high-voltage should be between 4 to 50 Hz, in order not to exceed on RF power radiation. Use of ac high voltage is not recommended in applications where remote aircraft detection by third party is to be avoided. The effectiveness of a modulated dc high voltage or an ac high voltage is comparable to modulated wing tip blowing methods, without using any moving parts to control air outlets. Wing tip side face 13 in above-discussed embodiment of the present invention has to be preferably a dielectric. Additionally wing tip side face 13 can also have triboelectric properties. If just triboelectric generation inside dielectric ducted pore lining 20 is utilized with no external HV application, then wing tip side face 13 can be of any material, a dielectric or otherwise, having neutral or near-neutral triboelectric properties, like aluminum. Further, airfoil upper surface 16 and airfoil lower surface 17 (FIG. 1 through FIG. 6) can have opposite triboelectric coatings or layers adjacent to wing tip side face 13 with neutral triboelectric properties, this would further reduce vortex growth by even better interlayer mixing in the vortex core. The use of composite materials for making of wings may render the airfoil external surfaces dielectric; this would necessitate turning the external airfoil surfaces selectively conductive electrically. In FIG. 2, wing tip side face inlets 11CI and 11DI may also have HV electrodes as shown connected to upper surface outlets 12DO, 12CO in FIG. 2; this electrical scheme is extended all the wing tip side face inlets and upper surface outlets shown in FIG. 1. These additional electrodes are then connected to the 0 volt line of the high voltage generator circuit generating the high voltage to high voltage electrode 25 and to similar electrodes not depicted in FIG. 2. The polarity-wise triboelectric property of upper surface 16, especially chord wise trailing to upper surface outlet 11DO (and similar outlets) has to be opposed to the polarity of the high voltage supplied to high voltage electrode 25 (and similar electrodes); in order to minimize turbulence on upper surface 16. The high voltage generator circuit can be positioned near the root of the individual rotorcraft blades and the electrical power needed for the circuit generated by a small wind turbine positioned on the individual blades. This configuration has the advantage of being retrofitted on existing helicopter blades with minimal mechanical changes. However, a conventional method used in automobile distributors can also be employed to have the high voltage circuit inside the rotorcraft and to distribute the high voltage to individual blades with a sealed distributor in the power shaft supplying torque to the rotor of the rotorcraft. It is recommended that the high voltage wiring inside the blades be kept simple. Connecting the 0 V or return line to the blade external surface (by making it selectively conductive, if the blade is made of dielectric materials) and one remaining high voltage line to HV electrode 25 (FIG. 2) is a reliable electrical solution. In case of retrofitting of existing rotorcraft blades with the present invention, the high voltage line to the HV electrode can be taken along the leading edge of the rotorcraft airfoil blade to connect to HV electrode 25 by entering through lower surface inlet 12DI, which is different from what is shown in FIG. 2.

FIG. 3 shows a further embodiment of present invention. In FIG. 3, 32AI, 32BI, 32CI and 32DI airfoil lower surface inlets to ducted pores (one shown as ducted pore 39 in FIG. 3) which correspondingly lead the air from the high pressure area (53 in FIG. 5 and FIG. 6) on airfoil lower surface 17 near leading edge 18 to wing tip side face outlets 32AO, 32BO, 32CO and 32DO. In this configuration, a series of functional wing tip side face jets can be produced through varying angles of attack to reduce wake and blade vortex.

FIG. 4 shows a working of the present invention, which superficially looks similar to prior art (U.S. Pat. No. 6,948, 906). However, prior art attempts to utilize the airfoil incident flow. In the case of the present invention, low-pressure distribution (52 in FIG. 5 and FIG. 6) on airfoil upper surface is utilized through dielectric ducts lined with triboelectric material and/or with high-voltage-supplied electrodes to span-wise located outlets to the low-pressure areas on the airfoil upper surface. 41AI, 41BI, 41CI and 41DI (FIG. 4) are chord-wise spaced wing tip side face inlets to ducted pores which correspondingly lead the air adjacent to wing tip side face 13 through dielectric ducts lined with triboelectric material and/ or with high-voltage-supplied electrodes (similar to dielectric ducted pore lining 20, HV cable 21 and HV electrode 25 in FIG. 2) to upper surface outlets 41AO, 41BO, 41CO and 41DO (FIG. 4) on upper surface 16. In this configuration too, functional wing tip side face suction can be produced through varying angles of attack.

FIG. 5 and FIG. 6 in data window 51 show values of CL (lift coefficient), Cm (moment coefficient) and Cd (drag coefficient) for 4.0° and 7.0° angles of attack respectively; the t/c value however remains constant. Letters T and TS in FIG. 5 and FIG. 6 denote turbulence and turbulent separation respectively. In FIG. 5, maximum negative pressure is generated between 0.03 c to 0.2 c (c is chord) on airfoil upper surface 16; and maximum positive pressure is generated a 0.0 c below airfoil lower surface 17. In FIG. 6, maximum negative pressure is generated between 0.01 c to 0.12 c on airfoil upper surface 16; and maximum positive pressure is generated at 0.015 c below airfoil lower surface 17. In both FIG. 5 and FIG. 6, positive pressure generation starts just at leading edge 18 and continues to increase towards airfoil lower surface 17; there is, however, no positive pressure post leading edge 18 towards airfoil upper surface 16. Only a hole directly on leading edge 18 is capable of capturing airfoil incident flow as defined by Dancila and in the disclosure of U.S. Pat. No. 6,948,906; any hole above leading edge 18 towards airfoil upper surface 16 will obviously not capture so-termed airfoil incident flow. Theoretically, large diameter holes or openings should be able to disturb an airfoil shape to the extent that the pressure distribution for an airfoil is distorted near those large diameter holes or openings. However, experiments show, that is not the case. May be due to boundary layer interactions with static charge on airfoil surface, even large diameter holes or wide slits (as large as 0.05 c in diameter or height and 0.12 c wide) do not allow any airfoil incident flow inside a duct inside the airfoil made for the purpose. Only when the lower edge of the slit is brought down nearly 0.05 c from the leading edge, does the airfoil incident flow start entering the duct inside the airfoil. The experiments were conducted using an approximate NACA 3216 airfoil section made of 0.5 mm thick craft paper card fixed on a rotorcraft setup at wing tip speeds varying between 0.02 to 0.1 Mach. With reference to the discussion hereinabove, in order to effect airflow to and from the side face of the wing tip, it is necessary to create effective pressure differential between the outlets and inlets of the ducts used in the implementation of the presentation. The inlets and outlets on the airfoil upper surface 16 and airfoil lower surface 17 have to be at specific chord-wise distances from leading edge 18. The respective distances for inlets and outlets will be determined by the maximum positive and negative pressures generated at chord-wise distances from leading edge 18 for a range of angles of attack for which an aircraft or rotorcraft is designed to operate. As a ball park point, it can be taken that for various airfoil shapes employed in subsonic and supersonic flights, upper surface outlets (11AO, 11BO. 11CO, 11DO in FIG. 1 and 41AO, 41BO, 41CO, 41DO in FIG. 4) are span-wise placed chord-wise from leading edge 18 at a distance no greater than one fifth of chord 14, and wing tip side face inlets (11AI, 11BI, 11CI, 11DI in FIG. 1 and 41DI, 41BI, 41CI, 41DI in FIG. 4) on wing tip side face 13 are placed chord-wise from leading edge 18 at a distance greater than one fifth of chord 14. Similarly, lower surface inlets (12AI, 12BI, 12CI, 12DI in FIG. 1 and 32AI, 32BI, 32CI, 32DI in FIG. 3) are span-wise placed chord-wise from leading edge 18 at a distance no greater than one tenth of chord 14, and wing tip side face outlets (12AO, 12BO, 12CO, 12DO in FIG. 1 and 32AO, 32BO. 32CO, 32DO in FIG. 3) on wing tip side face 13 are placed chord-wise from leading edge 18 at a distance greater than one tenth of chord 14. The respective interspacing of all the upper surface outlets and lower surface inlets is governed more by structural constraints; as the ducts (ducted pore 19 in FIG. 1) interconnecting them need not be strictly arcuately shaped; a spread out span-wise positioning avoids the possible blade tip weakening in prior art as disclosed in U.S. Pat. No. 6,948,906. A view at all the embodiments of the present invention from leading edge 18 shows that the upper surface outlets and lower surface inlets are alternately position with respect to each other, this is to avoid structural weakening to the wing or the blade. The diameters of the ducts are governed by the thickness of the airfoil at the wing tip side face. The interspacing of the wing tip side face outlets as well as wing tip side face inlets is determined again by structural constraints. The number of inlets as well as outlets is optimally between 3 to 8. However, a singular inlet outlet pair also is effective.

Experiments were conducted using a three-rotor configuration with a total sweep of 1.5 meters and a maximum tip speed of approximately 0.1 Mach. The straight rotor blades had a chord length of 100 mm and they were of uniform cross section. The airfoil section closely resembled NACA 2415. The airfoil sections were constructed by uniformly rolling a 2 mm thick aluminum sheet to a diameter of 3.8 meters. Thereafter, straight strips were cut and two symmetrical halves for each rotor blade airfoil were profiled with the use of hand press and hand tools; each pair of symmetrical halves for each rotor blade was joined by argon welding to get a completed rotor. Hand filing was employed to finish the airfoil profile to a near approximation. The fixing ends of the rotor blades were joined to sheet metal clamps which connected the rotor blades to the induction motor which provided rotation. Human observers were asked to judge the changes in blade slap or BVI noise. A smoke stick of around 30 mm diameter was held at various locations neat the rotorcraft wing tip, to ascertain the intensity and quality of wing tip vortex rollup and decay. The implementation of the various embodiments of the present invention showed that blade slap or BVI noise was converted in a kind of white noise due to complex multi-vortex interactions. Further studies are required to mitigate this white noise generation. However, the use of HV-supplied electrodes reduced the white noise to a tolerable neural level.

When the span of an airfoil is longer than the chord, the aspect ration would be greater than unity. An effective wing for the implementation of the present invention would have an aspect ratio much bigger than unity, more so, because with the implementation of the present invention, there is a loss of lift near the airfoil span near the wing tip. Further, a pointed wing tip cannot be used for the implementation of any of the forms of the present invention. The chord length at the wing tip is used to determine the aspect ration of the wing fit for the implementation of the present invention. Only when the span of the wing is more than the chord length at the wing tip, the wing is effectively suitable for the implementation of any of the forms of the present invention. A rotorcraft wings or blades generally have high aspect ratios to obtain high lift efficiencies. Rotorcraft wings or blades have a defined axis of rotation and the flight path of the rotorcraft wing or blade airfoil is by definition angular or curvilinear with respect the span of the wing or the blade. In contrast, the flight path of an idealized aircraft wing airfoil is perpendicular to the span of the wing, like, for example, inside a wind tunnel; but in a practical flight, the flight path is always curvilinear; this becomes noticeable during the spin maneuvers undertaken by an aircraft, when wing tip vortex related problems start affect the flight parameters.

What is claimed is:

1. A wing with at least one airfoil comprising:
   a span, a chord, an upper surface, a lower surface, a leading edge, a trailing edge and a wing tip with a side face;
   said span longer than said chord at said wing tip and said wing curvilinearly traveling at an angle to said span;
   a volume formed by an enclosure of said upper surface of said airfoil, said lower surface of said airfoil on said leading edge and said trailing edge of said airfoil, with said wing tip forming a span-wise closing of said volume;
   an inlet to at least one duct, located on said lower surface of said airfoil, at a chord-wise distance less than one tenth of the chord length of said airfoil from said leading edge;
   said duct positioned within said volume lengthwise and formed as a space curve;
   an outlet to said duct opening flush with the outer side of said side face of said wing tip;
   said outlet to said duct located at a chord-wise distance more than one tenth of the chord length of said airfoil from said leading edge;
   said outer side of said side face of said wing tip being a normal plane to said space curve;
   said inlet to said duct, located on said lower surface of said airfoil, allowing the air at high pressure near said inlet to enter said duct, travel through said duct and to exit from said outlet to said duct opening flush with the outer side of said side face of said wing tip; and
   said duct is dielectric and is lined with triboelectric material or with at least one high-voltage-supplied electrode, with said triboelectric material or said high-voltage-supplied electrode to produce at least one static-charged wing tip side face jet to effect a reduction in the vortex produced by said wing tip by momentarily decelerating the air near said wing tip to delay vortex rollup and to early diffuse the core of said vortex by promoting interlayer movement of said vortex due to static charge difference.

2. A wing in accordance with claim 1, wherein a first said duct with said inlet and said outlet followed by another said duct with another said outlet chord-wise, towards said trailing edge of said airfoil, following said outlet to said first duct and another said inlet to said another duct span-wise, towards the other side of said side face of said wing tip, following said inlet to said first duct form a series of ducts to produce a plurality of said wing tip side face jets to effect said reduction in said vortex produced by said wing tip of said wing.

3. A wing in accordance with claim 2, wherein said high-voltage-supplied electrode is supplied with a voltage ranging between 500 to 18000 volts with a current limit and said voltage either a dc voltage or an ac voltage with a frequency fixed or variable between 4 to 50 Hz generated by a high voltage generator circuit, and said voltage applied between said high-voltage-supplied electrode and a selective electrically conductive external surface of said wing.

4. A wing in accordance with claim 2, wherein said outer side of said side face of said wing tip is made of or coated with a dielectric with triboelectric properties.

5. A wing with at least one airfoil comprising:
   a span, a chord, an upper surface, a lower surface, a leading edge, a trailing edge and a wing tip with a side face;
   said span longer than said chord at said wing tip and said wing curvilinearly traveling at an angle to said span;
   a volume formed by an enclosure of said upper surface of said airfoil, said lower surface of said airfoil on said leading edge and said trailing edge of said airfoil, with said wing tip forming a span-wise closing of said volume;

an inlet to at least one duct, located on said lower surface of said airfoil, at a chord-wise distance more than one fifth of said chord of said airfoil from said leading edge;

said duct positioned within said volume lengthwise and formed as a space curve;

an outlet to said duct opening flush with the outer side of said side face of said wing tip;

said outlet to said duct located at a chord-wise distance less than one fifth of said chord of said airfoil from said leading edge;

said outer side of said side face of said wing tip being a normal plane to said space curve;

said inlet to said duct, located on said lower surface of said airfoil, allowing the air at high pressure near said inlet to enter said duct, travel through said duct and to exit from said outlet to said duct opening flush with the outer side of said side face of said wing tip; and said duct is dielectric and is lined with triboelectric material or with at least one high-voltage-supplied electrode, with said triboelectric material or said high-voltage-supplied electrode to produce at least one static-charged wing tip side face jet to effect a reduction in the vortex produced by said wing tip by momentarily decelerating the air near said wing tip to delay vortex rollup and to early diffuse the core of said vortex by promoting interlayer movement of said vortex due to static charge difference.

6. A wing in accordance with claim 5, wherein a first said duct with said inlet and said outlet followed by another said duct with another said outlet chord-wise, towards the trailing edge of said airfoil, following said outlet to said first duct and another said inlet to said another duct span-wise, towards the other side of said wing tip, following said inlet to said first duct form a series of ducts to produce a plurality of said wing tip side face jets.

7. A wing in accordance with claim 6, wherein said high-voltage-supplied electrode is supplied with a voltage ranging between 500 to 18000 volts with a current limit and said voltage either a dc voltage or an ac voltage with a frequency fixed or variable between 4 to 50 Hz generated by a high voltage generator circuit, and said voltage applied between said high-voltage-supplied electrode and a selective electrically conductive external surface of said wing.

8. A wing in accordance with claim 6, wherein said outer side of said side face of said wing tip is made of or coated with a dielectric with triboelectric properties.

9. A wing with at least one airfoil comprising:

a span, a chord, an upper surface, a lower surface, a leading edge, a trailing edge and a wing tip with a side face;

said span longer than said chord at said wing tip and said wing curvilinearly traveling at an angle to said span;

a volume formed by an enclosure of said upper surface of said airfoil, said lower surface of said airfoil on said leading edge and said trailing edge of said airfoil, with said wing tip forming a span-wise closing of said volume;

an inlet to a duct, located on said lower surface of said airfoil, at a chord-wise distance less than one tenth of said chord of said airfoil from said leading edge;

said duct positioned within said volume lengthwise and formed as a space curve;

an outlet to said duct opening flush with the outer side of said side face of said wing tip, located above the mean line of said airfoil, at a chord-wise distance more than one tenth of said chord of said airfoil from said leading edge;

said outer side of said side face of said wing tip being a normal plane to said space curve;

said inlet to said duct, located on said lower surface of said airfoil, allowing the air at high pressure near said inlet to enter said duct, travel through said duct and to exit from said outlet to said duct;

an outlet to at least one second duct, located on said upper surface of said airfoil, at a chord-wise distance less than one fifth said chord of said airfoil from said leading edge;

said second duct positioned within said volume lengthwise and formed as a space curve;

an inlet to said second duct opening flush with the outer side of said side face of said wing tip, located below the mean line of said airfoil, at a chord-wise distance more than one fifth of said chord of said airfoil from said leading edge;

said outer side of said side face of said wing tip being a normal plane to said space curve;

said inlet to said second duct allowing the air at high pressure near said inlet to enter said second duct to travel through said second duct and to exit from said outlet to said second duct, located on said upper surface of said airfoil; and said duct and said second duct being dielectric and lined with triboelectric material or with high-voltage-supplied electrodes, with said triboelectric material or said high-voltage-supplied electrodes producing static-charged wing tip side face jets to effect a reduction in the vortex produced by said wing tip by momentarily decelerating the air near said wing tip to delay vortex rollup and to early diffuse the core of said vortex by promoting interlayer movement of said vortex due to static charge difference.

10. A wing in accordance with claim 9, wherein said outlet to said duct followed chord-wise, towards the trailing edge of said airfoil, by said outlet to said second duct form a series of outlets flush with said outer side of said side face of said wing tip, with said inlet to said duct followed span-wise, towards the other side of said side face of said wing tip, by said inlet to said second duct forming a series of inlets, said inlet to said second duct opening flush with the outer side of said side face of said wing tip followed chord-wise, towards the trailing edge of said airfoil, by another said second inlet to another said second duct opening flush with said outer side of said side face forming a second series of inlets flush with said outer side of said side face, and said outlet to said second duct followed span-wise, towards the other side of said side face of said wing tip, by another said second outlet to said another said second duct forming a second series of outlets.

11. A wing in accordance with claim 10, wherein said high-voltage-supplied electrodes are supplied with a voltage ranging between 500 to 18000 volts with a current limit and said voltage either a dc voltage or an ac voltage with a frequency fixed or variable between 4 to 50 Hz generated by a high voltage generator circuit, and said voltage applied between said high-voltage-supplied electrodes and a selective electrically conductive external surface of said wing.

12. A wing in accordance with claim 10, wherein said outer side of said side face of said wing tip is made of or coated with a dielectric with triboelectric properties.

* * * * *